United States Patent
Moon et al.

(10) Patent No.: US 12,420,240 B2
(45) Date of Patent: Sep. 23, 2025

(54) COMPOSITE MEMBRANE COMPRISING HIGHLY PERMEABLE GUTTER LAYER AND METHOD FOR PREPARING SAME

(71) Applicant: KOREA RESEARCH INSTITUTE OF CHEMICAL TECHNOLOGY, Daejeon (KR)

(72) Inventors: Su Young Moon, Daejeon (KR); Jong Myeong Lee, Daejeon (KR); Bong Jun Chang, Daejeon (KR); Chang In Kong, Daejeon (KR); Jae-Hyeok Lee, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 342 days.

(21) Appl. No.: 18/005,455

(22) PCT Filed: Jul. 15, 2021

(86) PCT No.: PCT/KR2021/009136
§ 371 (c)(1),
(2) Date: Jan. 13, 2023

(87) PCT Pub. No.: WO2022/015088
PCT Pub. Date: Jan. 20, 2022

(65) Prior Publication Data
US 2023/0271144 A1 Aug. 31, 2023

(30) Foreign Application Priority Data
Jul. 15, 2020 (KR) .......... 10-2020-0087222

(51) Int. Cl.
*B01D 53/22* (2006.01)
*B01D 65/08* (2006.01)
(Continued)

(52) U.S. Cl.
CPC .......... *B01D 69/12* (2013.01); *B01D 53/228* (2013.01); *B01D 65/08* (2013.01);
(Continued)

(58) Field of Classification Search
CPC .... B01D 69/12; B01D 71/701; B01D 69/106; B01D 69/107; B01D 71/643;
(Continued)

(56) References Cited

U.S. PATENT DOCUMENTS 6,423,119 B1* 7/2002 Fadeev .................. B01D 65/02
                                                     210/500.36
10,569,218 B2* 2/2020 Liu .......................... C10L 3/105
(Continued)

FOREIGN PATENT DOCUMENTS

JP    H06126140 A    5/1994
JP    2016163871 A   9/2016
(Continued)

OTHER PUBLICATIONS

International Search Report for International Application No. PCT/KR2021/009136 dated Oct. 22, 2021.
(Continued)

*Primary Examiner* — Anthony R Shumate
(74) *Attorney, Agent, or Firm* — Harness, Dickey & Pierce, P.L.C.

(57) ABSTRACT

The present disclosure relates to a composite membrane in which a rubbery polymer is introduced into a gutter layer to suppress the physical aging of the highly permeable composite membrane, and more particularly, to a composite membrane comprising a porous support layer; a gutter layer on the porous support layer; and an active layer on the gutter layer, wherein the gutter layer comprises a blend of poly(l-trimethlsilyl-l-propyne) (PTMSP) and a rubbery polymer and a method for preparing the same. The composite mem-
(Continued)

brane according to the present disclosure has high permeation performance and a remarkable decline in physical aging leading to a decrease in permeability over time and thus has very high industrial applicability.

8 Claims, 3 Drawing Sheets

(51) Int. Cl.
  B01D 67/00    (2006.01)
  B01D 69/10    (2006.01)
  B01D 69/12    (2006.01)
  B01D 71/24    (2006.01)
  B01D 71/44    (2006.01)
  B01D 71/64    (2006.01)
  B01D 71/70    (2006.01)

(52) U.S. Cl.
  CPC ....... B01D 67/0002 (2013.01); B01D 69/106 (2022.08); B01D 69/107 (2022.08); B01D 71/24 (2013.01); B01D 71/44 (2013.01); B01D 71/643 (2022.08); B01D 71/701 (2022.08); *B01D 2257/504* (2013.01)

(58) Field of Classification Search
  CPC .. B01D 53/228; B01D 65/08; B01D 67/0002; B01D 71/24; B01D 71/44; B01D 2257/504
  See application file for complete search history.

(56) References Cited

U.S. PATENT DOCUMENTS

| | | | |
|---|---|---|---|
| 2011/0089110 A1* | 4/2011 | De Sitter | B01D 67/00793 977/773 |
| 2012/0241371 A1 | 9/2012 | Revanur et al. | |
| 2013/0041186 A1* | 2/2013 | Abba | B01J 8/006 568/897 |
| 2014/0251897 A1* | 9/2014 | Livingston | B01D 69/105 427/508 |
| 2016/0367948 A1* | 12/2016 | Song | B01D 53/228 |
| 2017/0216765 A1 | 8/2017 | Qiao et al. | |
| 2017/0369652 A1* | 12/2017 | Hefner, Jr. | C08G 73/0644 |
| 2018/0142075 A1* | 5/2018 | Wood | B01D 67/00793 |
| 2019/0076777 A1* | 3/2019 | Mochizuki | B01D 53/228 |
| 2020/0009511 A1* | 1/2020 | Agarwal | B01D 69/106 |
| 2020/0238219 A1 | 7/2020 | Lee et al. | |
| 2021/0236987 A1* | 8/2021 | Sandru | B01D 71/32 |
| 2021/0291120 A1* | 9/2021 | Yahaya | C10L 3/103 |
| 2023/0001349 A1* | 1/2023 | Vaidya | B01D 71/32 |

FOREIGN PATENT DOCUMENTS

| | | |
|---|---|---|
| KR | 10-2019-0051879 A | 5/2019 |
| KR | 10-2019-0127544 A | 11/2019 |
| KR | 10-2020-0017680 A | 2/2020 |

OTHER PUBLICATIONS

Written Opinion of the International Searching Authority for International Application No. PCT/KR2021/009136 dated Oct. 22, 2021.

* cited by examiner

COMPOSITE MEMBRANE COMPRISING HIGHLY PERMEABLE GUTTER LAYER AND METHOD FOR PREPARING SAME

TECHNICAL FIELD

The present disclosure relates to a composite membrane in which a rubbery polymer is introduced into a gutter layer to suppress the physical aging of the highly permeable composite membrane, and more particularly, to a composite membrane comprising a porous support layer; a gutter layer on the porous support layer; and an active layer on the gutter layer, wherein the gutter layer comprises a blend of poly(l-trimethlsilyl-l-propyne) (PTMSP) and a rubbery polymer and a method for preparing the same.

The present application claims the benefit of Korean Patent Application No. 10-2020-0087222 filed on Jul. 15, 2020 with the Korean Intellectual Property Office, the disclosure of which is incorporated herein by reference in its entirety.

BACKGROUND ART

Among a variety of separation technologies including distillation technology, adsorption technology and extraction technology, separation membrane technology is a very important technology sector in a situation in which energy and environmental issues are emerging due to low energy and eco-friendliness. In particular, gas separation membranes are widely used to separate greenhouse gases such as carbon dioxide, or selectively separate useful gases that can be chemically converted, such as methane, carbon monoxide and hydrogen. To this end, studies have been made to develop a huge number of materials for selective separation of specific gases, and materials having high selectivity and high permeability have been developed.

However, to apply materials of selective layers with high selectivity and high permeability, it is essential to have support layers to support the selective layer materials and gutter layers to play a bridging role between the support layers and the selective layers, and the gutter layers need to have a very uniform thickness at each interface without inhibiting the permeation selectivity of the selective layers.

Korean Patent Publication Nos. 10-2020-0017680 and 10-2019-0051879 related to gas separation membranes with gutter layers disclose a polymer such as poly(l-trimethlsilyl-l-propyne) (PTMSP) and polydimethlysiloxane (PDMS) as a material of a protective layer on a gutter layer or an active layer in the gas separation membrane. However, a solution coating method is simply used to form the protective layer, so it is practically impossible to form a thin film of a very uniform thickness due to the presence of the polymer of the gutter layer in a porous structure of a porous support layer, and it is not an effective structure of the gutter layer.

Recently, one of the materials of the gutter layers, poly(l-trimethlsilyl-l-propyne) (PTMSP) is a material having very high gas permeation performance (47,000 Barrer for $CO_2$), but it has been reported that separation membranes prepared therefrom suffer very serious physical aging leading to a decrease in permeability over time, and the decrease is up to 95% or more relative to the initial permeation performance. In the development of industrial composite membranes, it is foreseen that it is necessary to solve the physical aging issue for the efficient use as direct selective layer materials as well as highly permeable gutter layers for selective layer materials.

On the other hand, polydimethylsiloxane (PDMS) known as a representative rubbery polymer shows $CO_2$ permeance=~6,000 GPU on the basis of the composite membrane performance reported so far due to even lower permeability (3,800 Barrer for $CO_2$) than rubbery polymers or PTMSP free of aging, and it is known that PDMS is less suitable for the material of the gutter layer than PTMSP.

The inventors have conducted many studies to suppress physical aging leading to a decrease in permeability of gutter layer polymer over time, and completed the present disclosure.

DISCLOSURE

Technical Problem

The present disclosure is developed to solve the above-described problem, and therefore the present disclosure is directed to providing a composite membrane for suppressing physical aging leading to a decrease in permeability of gutter layer polymer over time and a method for preparing the same.

Additionally, the present disclosure is directed to providing a composite membrane comprising a gutter layer having a very uniform thickness at each interface without inhibiting the permeation selectivity of a selective layer and a method for preparing the same.

Technical Solution

To solve the above-described problem, the present disclosure provides a composite membrane comprising a gutter layer comprising a blend of a rubbery polymer free of aging and a silicone-based glassy polymer having high permeation performance at different compositions.

Additionally, the present disclosure provides a method for preparing a composite membrane comprising preparing a mixed solution of a rubbery polymer and a silicone-based glassy polymer having high permeation performance using an organic solvent and forming a film on water by water casting to prepare a gutter layer and introducing the gutter layer on a porous support layer in order to form the gutter layer having a very uniform thickness at each interface without inhibiting the permeation selectivity of a selective layer.

Advantageous Effects

As described above, the composite membrane according to the present disclosure has high permeation performance and a remarkable decline in physical aging leading to a decrease in permeability over time and thus has very high industrial applicability.

In the composite membrane according to the present disclosure, the gutter layer is prepared by water casting and introduced on the porous support layer and thus has a very uniform thickness at each interface without inhibiting the permeation selectivity of the selective layer.

Additionally, the gutter layer according to the present disclosure can be used as the direct selective layer material as well as the highly permeable gutter layer for the selective layer material in the development of industrial composite membranes.

BEST MODE

Figure 1:
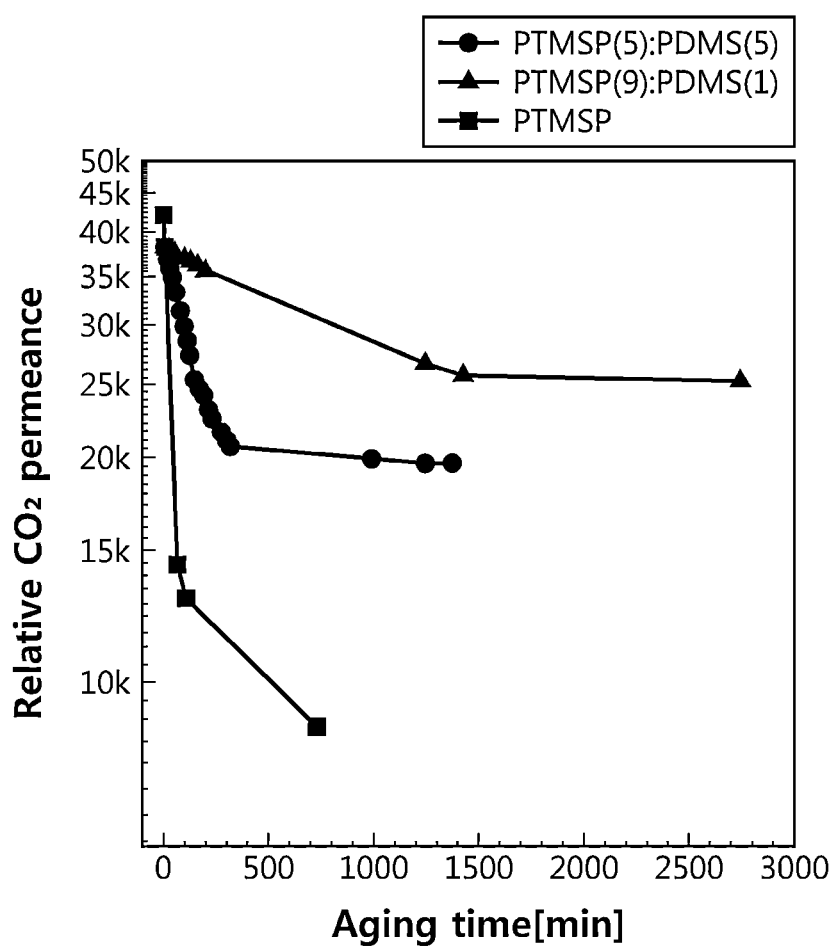
FIG. 1 is a graph showing $CO_2$ permeance and an anti-aging effect of a gutter layer according to an embodiment of the present disclosure.

Hereinafter, the present disclosure will be described in detail. It should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

To solve the above-described problem, the present disclosure provides a composite membrane comprising a porous support layer; a gutter layer on the porous support layer; and an active layer on the gutter layer, wherein the gutter layer comprises a blend of poly(1-trimethlsilyl-1-propyne) (PTMSP) and a rubbery polymer.

According to an embodiment of the present disclosure, the porous support layer may be at least one polymer selected from polysulfone, polyethersulfone, polyetherethersulfone, polyphenylsulfone, polyacrylonitrile, polyetherimide, polyimide, polyamide, polyimide-amide, polyethylene, polyethyleneterephthalate, polyetherketone, polyetheretherketone, polyurethane, nylon and polyvinylidenefluoride.

According to an embodiment of the present disclosure, the active layer may be at least one polymer selected from acetylated methyl cellulose, polymers of intrinsic microporosity, thermally rearranged polymers and perfluoropolymers, including the above-described polymers. Additionally, polymers used as the commonly used materials of gas separation membranes may be used without limitation.

In this instance, the polymers of intrinsic microporosity may include any material widely used in sensors and gas separation membranes, for example, polymers having microporosity in molecules in chemical structures.

Additionally, a typical example of the thermally rearranged polymers may include those induced from polyimides comprising at least one functional group of a hydroxyl group or an amine group or copolymers comprising the polyimides through a thermal treatment process, and specifically, may be at least one selected from the group consisting of polybenzoxazole induced from polyimide having a hydroxyl group, polypyrrolone induced from polyimide having an amine group, polybenzoxazole-pyrrolone copolymers induced from the polyimides having hydroxyl and amine groups, polypyrrolone-imide copolymers induced from the copolymers comprising the polyimides and/or polybenzoxazole-imide copolymers.

The thermally rearranged polymers according to the present disclosure may be induced from the above-described polyimides or the copolymers comprising the polyimides through the thermal treatment process. Specifically, the predetermined thermal treatment process may convert the polyimide having a hydroxyl group to polybenzoxazole, the polyimide having an amine group to polypyrrolone and the polyimides having a hydroxyl group and an amine group to polybenzoxazole-pyrrolone copolymers. Additionally, the copolymers comprising the polyimides may be converted to polypyrrolone-imide copolymers and/or polybenzoxazole-imide copolymers by the predetermined thermal treatment process.

In this instance, the thermally rearranged polymers induced through the thermal treatment process are subjected to a morphology change such as a significant increase in fractional free volume (FFV) and an increase in d-spacing with the decreasing density and the increasing size of micropores by thermal conversion reaction, thereby greatly increasing the gas permeability and improving the chemical resistance and heat resistance of the polymer.

According to an embodiment of the present disclosure, the thickness of the gutter layer may range from 10 to 10,000 nm, and more preferably 50 to 1,000 nm. When the thickness of the gutter layer exceeds the corresponding thickness range, permeability reduces, and when the thickness of the gutter layer is less than the corresponding thickness range, low mechanical properties make it impossible to use as the gutter layer.

According to an embodiment of the present disclosure, the rubbery polymer may be at least one polymer selected from polydimethlysiloxane (PDMS), silicone-based rubber, polybutadiene, nitrile rubber, acrylic rubber, butyl rubber, polyisoprene and poly(styrene-co-butadiene).

According to an embodiment of the present disclosure, a mix ratio of the poly(1-trimethlsilyl-1-propyne) (PTMSP) and the rubbery polymer in the polymer blend may range from 9:1 to 5:5 by weight.

Additionally, to solve the above-described problem, the present disclosure provides a method for preparing the composite membrane including forming the porous support layer; forming the gutter layer comprising the blend of the poly(1-trimethlsilyl-1-propyne) (PTMSP) and the rubbery polymer on the porous support layer; and forming the active layer on the gutter layer.

According to an embodiment of the present disclosure, the mix ratio of the poly(1-trimethlsilyl-1-propyne) (PTMSP) and the rubbery polymer in the polymer blend may range from 9:1 to 5:5 by weight.

According to an embodiment of the present disclosure, the step of forming the gutter layer preferably includes preparing a mixed solution of the poly(1-trimethlsilyl-1-propyne) (PTMSP) and the rubbery polymer using an organic solvent and forming a film on water by water casting.

According to an embodiment of the present disclosure, the organic solvent in the step of forming the gutter layer preferably includes at least one selected from chloroform, dipropylamine, isobutanol, cyclohexene, butanol, isovaleric acid, ethylether, isoamyl alcohol, ethylacetate, pentanol, 2-pentanone, hexanol, heptanol, acetic anhydride, pentyl acetate, octanol, cyclohexane, 2-hexanone, n-butyronitrile, diethylcarbonate, cyclohexanol, heptaldehyde, t-butyl chloride, benzyl alcohol, nitromethane, diisobutyl ketone, aniline and acetophenone.

According to an embodiment of the present disclosure, the mixed solution in the step of forming the gutter layer may comprise the poly(1-trimethlsilyl-1-propyne) (PTMSP) and the rubbery polymer in an amount ranging from 0.01 to 10 weight %, and more preferably 0.1 to 2 weight %. At high concentrations above the above-described range, the gutter layer is thick and reduces in permeability, and at low concentrations less than the above-described range, the prepared gutter layer is too thin and has low mechanical properties, and thus cannot be used as the gutter layer.

According to an embodiment of the present disclosure, the thickness of the gutter layer may range from 10 to 10,000 nm, and more preferably 20 to 1,000 nm. When the thickness of the gutter layer exceeds the corresponding thickness range, permeability reduces, and when the thickness of the gutter layer is less than the corresponding thickness range, low mechanical properties makes it impossible to use as the gutter layer.

Hereinafter, an embodiment and an example of the present disclosure will be described in sufficient detail with reference to an exemplary embodiment of the present disclosure together with the accompanying drawings to enable those skilled in the art to easily practice the invention. In particular, the technical aspect of the present disclosure and the essential elements and operations are not limited thereto. Additionally, the present disclosure may be embodied by many other types of equipment, and is not limited to the embodiments and examples described herein.

<Preparation Example> Preparation of a Gutter Layer Polymer Blend Solution

The polymer blend that forms the gutter layer according to an embodiment of the present disclosure is prepared by the following method.

Poly(1-trimethlsilyl-1-propyne) (PTMSP) (GELEST, INC) and polydimethlysiloxane (PDMS) (product name: Sylgard 184 Elastomer Base, available from Dow Corning Corporation) are dissolved in a chloroform solvent at a weight ratio of the PDMS to the PTMSP of 0 to 100, and the polymer concentration is adjusted to 0.1 to 2 weight % by adding the chloroform solvent to the prepared solution.

<Example A> Preparation of a Composite Membrane Comprising a Gutter Layer

The gutter layer polymer blend solution prepared according to the preparation example according to an embodiment of the present disclosure is dripping on water in an amount of 0.5 microliters using a micropipette in a water tank filled with water at the temperature of the water tank adjusted to 25° C. to prepare a film, and the prepared film on the water is placed on a porous polysulfone (PSF) support (pore diameter: 10 to 20 nm, Toray Chemical Korea Inc.) by lifting up the support from the water to prepare a composite membrane. Subsequently, the prepared composite membrane is left to dry naturally to remove water. In this instance, the composition used when preparing the gutter layer of the prepared composite membrane and the thickness of the gutter layer are summarized in the following table 1.

TABLE 1

| | Composition of gutter layer (Weight ratio) | Polymer concentration (%) | Gutter layer thickness (nm) |
|---|---|---|---|
| Comparative example | PTMSP | 0.75 | 20 |
| Example 1 | 9:1 | 0.75 | 24 |
| Example 2 | 8:2 | 0.75 | 25 |
| Example 3 | 7:3 | 0.75 | 27 |
| Example 4 | 6:4 | 0.75 | 28 |
| Example 5-1 | 5:5 | 0.75 | 22 |
| Example 5-2 | 5:5 | 0.1 | 11 |
| Example 5-3 | 5:5 | 0.25 | 13 |
| Example 5-4 | 5:5 | 0.5 | 17 |
| Example 5-5 | 5:5 | 1 | 55 |
| Example 5-6 | 5:5 | 2 | 200 |

To compare aging in the composite membrane, the present disclosure forms the single thin film on water using water casting and places it on the porous polysulfone (PSF) support to prepare the composite membrane. To this end, the PTMSP and the PDMS are dissolved in the chloroform solvent at the weight ratio of the PDMS to the PTMSP of 0 to 1 to prepare the solution. In this instance, the gutter layer is prepared by adjusting the total polymer content in the solution to the concentration of 0.1 to 2 weight % relative to the chloroform solvent.

In this instance, when the mix ratio of the PDMS to the PTMSP is larger than 5:5, due to the high flowability of the PDMS, it is impossible to form the film having the optimal mechanical strength on water, and it is difficult to stably attach the film to the porous support. Additionally, when the mix ratio of the PDMS to the PTMSP is less than 9:1, the formed film is very thin, so it is impossible to obtain the film having the optimal mechanical strength.

The following table 2 summaries a comparison of initial $CO_2$ permeation performance, permeation performance after aging and $CO_2/N_2$ selectivity (polymer concentration=0.75 weight %) of the composite membrane as a function of the mix ratio of the PDMS. In all conditions, $CO_2$ permeability after 24 hours-aging is lower than $CO_2$ permeability before aging, but compared to a composite membrane made of PTMSP alone, at least twice improvement in permeability after aging is found. Additionally, a slight increase in selectivity is observed as the effect of the aging.

TABLE 2

| | | Permeability and selectivity before aging | | Permeability and selectivity after 24 hours-aging | |
|---|---|---|---|---|---|
| | PTMSP:PDMS (Weight ratio) | $CO_2$ GPU | $CO_2/N_2$ | $CO_2$ GPU | $CO_2/N_2$ |
| Comparative example | PTMSP | 42,100 | 3.9 | 8,750 | 4.2 |
| Example 1 | 9:1 | 37,300 | 3.8 | 19,240 | 4.3 |
| Example 2 | 8:2 | 36,290 | 3.9 | 20,050 | 4.4 |
| Example 3 | 7:3 | 38,230 | 3.8 | 21,000 | 4.2 |
| Example 4 | 6:4 | 41,000 | 3.7 | 22,300 | 4.2 |
| Example 5 | 5:5 | 38,800 | 3.9 | 25,600 | 4.5 |

<Analysis Example> Gas Permeability and Anti-Aging Effect Analysis of a Composite Membrane The gas permeability test of the composite membrane prepared according to an embodiment of the present disclosure is performed by attaching the prepared composite membrane to a thick circular PET film having a hole having an inner diameter of 2 cm, and an outer diameter of 7 cm and a thickness of 100 μm to prepare a composite membrane disc for permeability measurement.

To get ready to measure permeability, a lower plate and a circular upper plate made of stainless steel are placed with a dead-end gas permeable cell having a rubber gasket interposed between them and tightly fixed to prevent gas leaks.

The gas permeation is measured using pure $CO_2$ and $N_2$ gas. Each gas is fed into the permeable cell under the pressure of 2 bars, and the gas flow rate of the gas flowing through the prepared composite membrane disc is measured using a bubble flow meter.

The permeability and GPU are calculated using the measured permeation flow rate through the following equations.

Permeability=$Q$ (cm^3/sec)/($A$ (cm^2)*$P$ (cmHg)) (Equation 1)

1 [GPU]=1*[10^(−6)*$Q$ (cm^3/sec)/($A$ (cm^2)*$P$ (cmHg))] (Equation 2)

In this instance, Q is the permeation flow rate, A is the permeation area of the composite membrane, and P is the pressure of compressed feed gas.

FIG. 1 is a graph showing $CO_2$ permeance and an anti-aging effect of the gutter layer according to an embodiment of the present disclosure. To compare aging mitigation as a function of PDMS content, the graph shows a comparison of a decrease in permeability over time in the composite membranes prepared by water casting using PTMSP:PDMS at a weight ratio of 5:5 and 9:1 and PTMSP alone.

Figure 2:
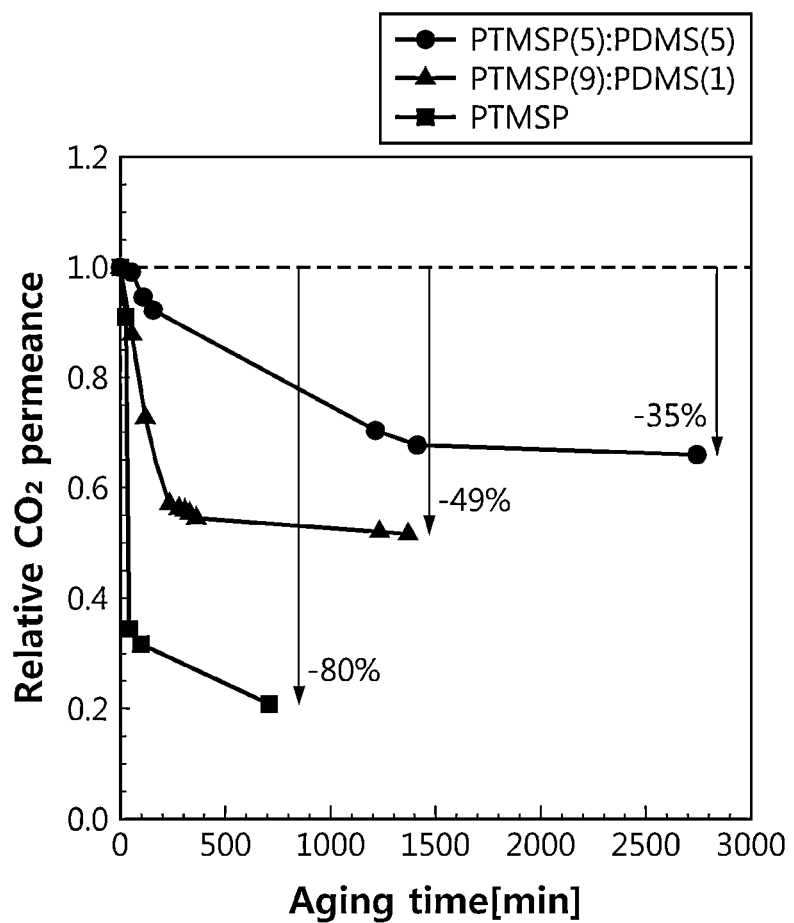
FIG. 2 shows a comparison of relative anti-aging effect of a gutter layer as a function of a ratio of poly(1-trimethlsilyl-1-propyne) (PTMSP) and polydimethlysiloxane (PDMS) according to an embodiment of the present disclosure.

FIG. 2 shows a comparison of relative anti-aging effect of the gutter layer as a function of a ratio of PTMSP and PDMS according to an embodiment of the present disclosure. As can be seen from FIG. 2, the composite membrane using PTMSP alone has at least 80% decrease in permeation performance over time, while PTMSP:PDMS 9:1 shows about 50% performance decrease relative to the initial performance and PTMSP:PDMS 5:5 shows about 35% performance decrease relative to the initial performance. In conclusion, despite aging leading to a decrease in permeability over time, it is possible to ensure the $CO_2$ permeance of 25,000 GPU at the 5:5 ratio.

Figure 3:
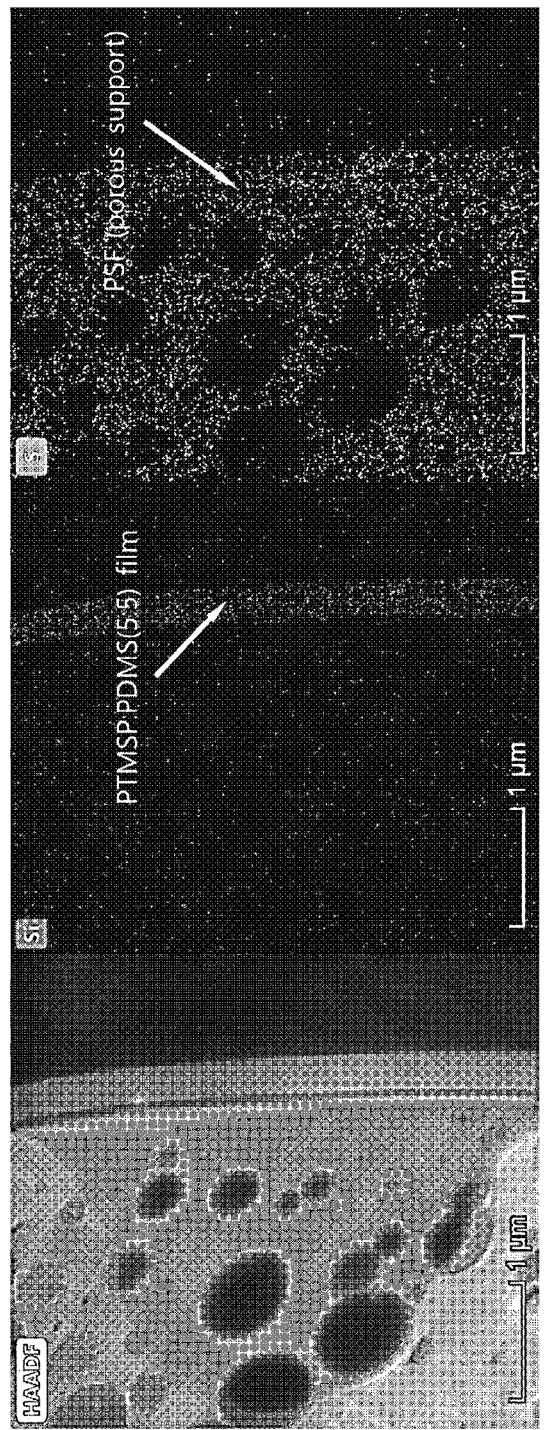
FIG. 3 shows a transmission electron microscopy (TEM) image (leftmost) of a composite membrane according to an embodiment of the present disclosure and a PTMSP:PDMS 5:5 film (middle) and a PSF support (rightmost) determined through energy dispersive spectroscopy (EDS) elemental analysis.

FIG. 3 shows a transmission electron microscopy (TEM) image (leftmost) of the composite membrane according to an embodiment of the present disclosure and the PTMSP:PDMS 5:5 film (middle) and the PSF support (rightmost) determined through energy dispersive spectroscopy (EDS) elemental analysis. The TEM image and the EDS analysis show the detailed structure that the film prepared at the solution concentration (total polymer concentration 2 weight %) of 5:5 ratio is stably attached to the porous support at the thickness of 200 nm.

What is claimed is:

1. A composite membrane, comprising:
a porous support layer;
a gutter layer on the porous support layer; and
an active layer on the gutter layer,
wherein the gutter layer comprises a blend of poly(l-trimethylsilyl-l-propyne) (PTMSP) and a rubbery polymer,
wherein a mix ratio of the poly (l-trimethylsilyl-l-propyne) (PTMSP) and the rubbery polymer in the polymer blend ranges from 9:1 to 5:5 by weight.

2. The composite membrane according to claim 1, wherein the porous support layer is at least one polymer selected from polysulfone, polyethersulfone, polyetherethersulfone, polyphenylsulfone, polyacrylonitrile, polyetherimide, polyimide, polyamide, polyimide-amide, polyethylene, polyethyleneterephthalate, polyetherketone, polyetheretherketone, polyurethane, nylon and polyvinylidenefluoride.

3. The composite membrane according to claim 1, wherein the active layer is at least one polymer selected from acetylated methyl cellulose, polymers of intrinsic microporosity, thermally rearranged polymers and perfluoropolymers.

4. The composite membrane according to claim 1, wherein the rubbery polymer is at least one polymer selected from polydimethlysiloxane (PDMS), silicone-based rubber, polybutadiene, nitrile rubber, acrylic rubber, butyl rubber, polyisoprene and poly (styrene-co-butadiene).

5. A method for preparing a composite membrane, comprising:
forming a porous support layer;
forming a gutter layer of a blend of (l-trimethylsilyl-l-propyne) (PTMSP) and rubbery polymer on the porous support layer; and
forming an active layer on the gutter layer
wherein a mix ratio of the poly (l-trimethylsilyl-l-propyne) (PTMSP) and the rubbery polymer in the polymer blend ranges from 9:1 to 5:5 by weight.

6. The method for preparing a composite membrane according to claim 5, wherein the step of forming the gutter layer comprises preparing a mixed solution of the poly (l-trimethylsilyl-l-propyne) (PTMSP) and the rubbery polymer using an organic solvent and forming a film on water by water casting.

7. The method for preparing a composite membrane according to claim 6, wherein the organic solvent in the step of forming the gutter layer is at least one selected from chloroform, dipropylamine, isobutanol, cyclohexene, butanol, isovaleric acid, ethylether, isoamyl alcohol, ethylacetate, pentanol, 2-pentanone, hexanol, heptanol, acetic anhydride, pentyl acetate, octanol, cyclohexane, 2-hexanone, n-butyronitrile, diethylcarbonate, cyclohexanol, heptaldehyde, t-butyl chloride, benzyl alcohol, nitromethane, diisobutyl ketone, aniline and acetophenone.

8. The method for preparing a composite membrane according to claim 6, wherein the mixed solution in the step of forming the gutter layer comprises the poly(l-trimethylsilyl-l-propyne) (PTMSP) and the rubbery polymer in an amount ranging from 0.01 to 10 weight %.

* * * * *